Figure 1:
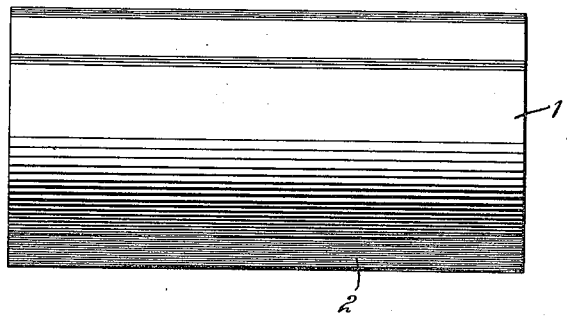

June 19, 1923.

J S. KINNEY

BUSHING

Filed July 10, 1918

1,458,943

WITNESSES:
J.P.Wurmb.
O.E.Bee.

INVENTOR
J. Stanley Kinney.
BY
Wesley G. Carr
ATTORNEY

Patented June 19, 1923.

1,458,943

UNITED STATES PATENT OFFICE.

J STANLEY KINNEY, OF WILKINSBURG, PENNSYLVANIA, ASSIGNOR TO WESTINGHOUSE ELECTRIC & MANUFACTURING COMPANY, A CORPORATION OF PENNSYLVANIA.

BUSHING.

Application filed July 10, 1918. Serial No. 244,193.

*To all whom it may concern:*

Be it known that I, J STANLEY KINNEY, a citizen of the United States, and a resident of Wilkinsburg, in the county of Allegheny and State of Pennsylvania, have invented a new and useful Improvement in Bushings, of which the following is a specification.

My invention relates to bushings, washers or the like, and it has for its primary object the construction of articles of the above mentioned character which shall be mechanically strong and which shall possess self-lubricating qualities.

One object of my invention is to provide bushings, washers or the like constituting superimposed layers of impregnated sheet material which shall be unaffected by moisture, relatively wide temperature changes and oils and weak acids.

Another object of my invention is to construct long tubes of impregnated fibrous material, having a lubricant distributed throughout their structure, which may be cut into suitable lengths to provide bushings, washers or the like.

Another object of my invention is to construct bushings which, on account of being spirally wound, may be turned down or reamed without undue weakening.

A further object of my invention is to construct bushings having self-lubricating properties and in which the lubricant shall be so located that leakage thereof will be impossible.

A further object of my invention is to provide bushings, washers or the like which shall possess such great strength in resisting shearing action as to provide adequate supports for bolts enclosed therein.

A still further object of my invention is the manufacture of bushings which shall be noiseless in operation when employed between metallic surfaces.

With these and other objects in view, my invention will be more fully described, illustrated in the drawings, in the several views of which corresponding numerals indicate like parts, and then particularly pointed out in the appended claims.

Figure 2:
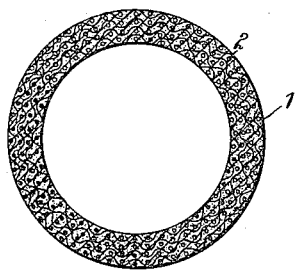
Figure 3:
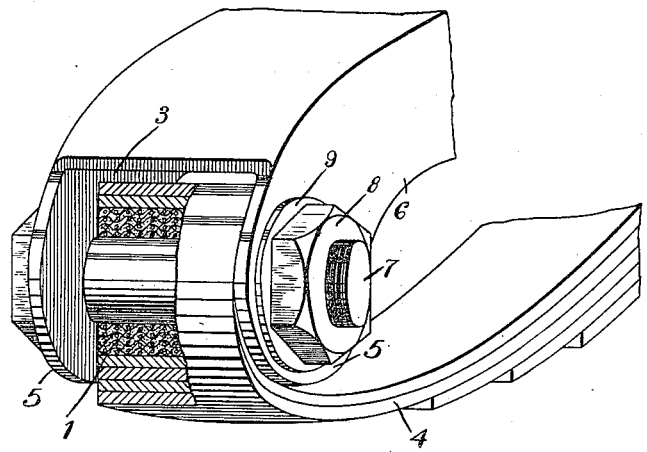

In the drawings, Fig. 1 is a side elevation of a bushing embodying my invention; Fig. 2 is a transverse sectional view of the bushing shown in Fig. 1, and Fig. 3 is a fragmentary perspective view, partially in section, showing my improved bushing employed in a motor-vehicle spring-suspension.

In practising my invention, I may employ sheet material impregnated with a suitable binder containing a lubricant. The impregnated sheet material may be wound about a mandrel to form a tube, under the action of heat or it may be subsequently subjected to heat and pressure in a mold to compact the material and harden the binder with which it is impregnated. The binder employed may also contain a small percentage of wax which will insure a smoother surface in the finished product. The tubes may be constructed in any suitable length and cut into sections, the length of which will be determined by the duty which they are to perform.

Although the tubes may be formed in various ways, I prefer to wind the tube upon a mandrel after which it may be subjected to heat and pressure in a mold, this process insuring a very compact and durable bushing.

In Fig. 1 is shown a bushing 1 constructed in accordance with my invention in which fibrous sheet material 2, such as duck, is employed. The duck being especially adapted to construct a bushing of this kind on account of the great binding action between layers of it when it has been impregnated with a suitable binder, such as a phenolic condensation product. The duck may be drawn through a bath of an adhesive containing graphite after which the material thus impergnated may be wound into a tube. The material, however, may also be first subjected to treatment in a bath of an adhesive containing graphite and then be slightly dried and afterward subjected to a second coating of the same adhesive without graphite. The second coating of an adhesive insures a strong binding action between layers of the treated material when it is wound and subjected to heat and pressure. The duck, having an irregular surface, provides depressions in which the graphite may be trapped and firmly held in place when layers of the sheet material are superimposed, one upon another, and the body hardened by heat and pressure.

A small percentage of wax may be introduced into the adhesive and applied to the material when it is treated. This small addition of wax has been found advantageous in obtaining a highly polished surface as well as acting as an additional lubricant in the finished product.

In Fig. 3, I have shown one of the many applications of my improved bushing 1 as employed in automobile construction. The bushing 1, in this instance, may be driven into the eye 3 of the spring 4 which is then disposed between the ears 5 of a frame element 6. A bolt 7 may then be driven through the ears 5 and the bushing 1 and held firmly in place by the nut 8 and washer 9. A bushing constructed in accordance with my invention obviates any necessity for grease cups which are commonly employed for lubricating the surface of the bolt which holds the spring and frame together.

My improved bushing employed in this manner will insure noiseless operation, when subjected to shocks, as well as provide thorough lubrication. Furthermore, on account of the laminated structure employed in constructing this bushing, great strength and durable wearing qualities are obtained and it may be reamed or turned to allow for slight changes in dimensions without injurious effect on the bushing. Since I may construct relatively long tubes, various sizes of bushings, as to length, may be cut therefrom, as well as relatively thin washers possessing highly desirable qualities, when employed between metallic surfaces.

Although I have described a method by which bushings, washers or the like may be constructed and have illustrated an application of my improved bushing, it is obvious that various methods of constructing the above mentioned articles may be employed without departing from the spirit of my invention and I desire, therefore, that no limitations shall be imposed except such as are indicated in the appended claims.

I claim as my invention:

1. A bushing, washer or the like comprising superimposed convolutions of fibrous sheet material impregnated with a hardened phenolic condensation product containing a lubricant.

2. A bushing, washer or the like comprising superimposed convolutions of duck impregnated with a hardened phenolic condensation product containing graphite.

3. A bushing, washer or the like comprising superimposed convolutions of duck impregnated with a hardened phenolic condensation product having graphite uniformly distributed therein.

4. A bushing, washer or the like comprising a laminated material impregnated with a hardened binder having a mixture of graphite and wax distributed therein.

5. A bushing, a washer or the like comprising superimposed convolutions of sheet material impregnated with a hardened phenolic condensation product containing a lubricant.

In testimony whereof, I have hereunto subscribed my name this 25th day of June 1918.

J. STANLEY KINNEY.